H. W. IZOD.
APPARATUS FOR OXYGENATING AIR.
APPLICATION FILED AUG. 12, 1910.
1,074,550.
Patented Sept. 30, 1913.
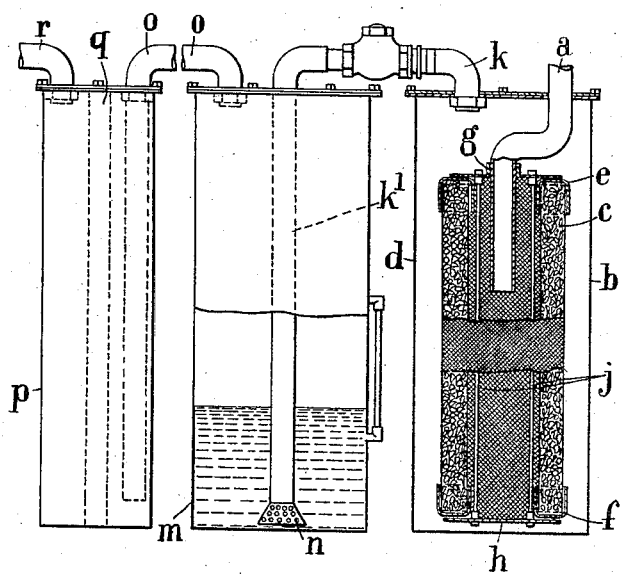

UNITED STATES PATENT OFFICE.

HERBERT WILLIAM IZOD, OF UPPER NORWOOD, ENGLAND.

APPARATUS FOR OXYGENATING AIR.

1,074,550.  Specification of Letters Patent.  Patented Sept. 30, 1913.

Application filed August 12, 1910. Serial No. 576,844.

*To all whom it may concern:*

Be it known that I, HERBERT WILLIAM IZOD, a subject of the King of Great Britain, residing at Upper Norwood, Surrey, England, have invented new and useful Improvements in Apparatus for Oxygenating Air, of which the following is a specification.

This invention relates to the production of a combustible gaseous mixture for use in internal combustion engines or for burning with ordinary or other suitable burners or mantles for the production of heat or light, and particularly to the production of a combustible mixture whose calorific value is enhanced by the enriching of the atmospheric air employed by means of oxygen.

According to this invention atmospheric air is passed over chemical substances which give up their oxygen and the resultant is passed through a carbureter of any suitable form.

By means of this invention the explosive, heating and lighting powers of the combustible mixture are considerably increased and therefore such combustible mixture is eminently suitable for use for manufacturing and commercial purposes, for cooking and for lighting. Owing to the calorific efficiency of the resultant gas the quantity of liquid hydrocarbon required to carburet a given quantity of combustible mixture is considerably reduced, thereby achieving an economical result. Further, hydrocarbons such as heavy liquid hydrocarbons can be employed which have hitherto been found to be unsatisfactory for carbureting air owing to their high percentage either of carbon or of incombustible elements.

The present invention may be carried into effect by passing atmospheric air over the chemical substance in a dry state. This method may be carried out by passing atmospheric air through a vessel containing the chemical substances arranged in such manner that a large surface of the latter is exposed, and subsequently through a carbureter containing petrol or other liquid hydrocarbon.

Baffle plates, gauze screens and like devices may be employed and the chemical substances may be in the form of powder, granules, cubes, balls or the like. A gauze screen should also be used to free the atmospheric air from dust and like impurities. In cases where the mixture passes rapidly through the plant a trap may be provided in the form of a tank in which may be collected the free particles of liquid carried through the pipes by the excessive velocity of the mixture, and if desired, such trap may be so arranged that the liquid collected thereby may be returned to the carbureter.

In order that this invention may be fully understood reference is to be had to the accompanying drawings which illustrate in sectional elevation the preferred form of apparatus for carrying out the same.

Atmospheric air to be carbureted is admitted through a pipe $a$ into a vessel $b$. In said vessel $b$ and directly connected to the pipe $a$ is a container for the chemical substances. The container comprises two cylinders of wire gauze $c$ and $d$ arranged concentrically between two rings $e$, $f$ which are of U section. The ring $e$ is secured by means of a flanged screwed socket $g$ to the pipe $a$, which projects into the cylinder $d$ so that the air admitted by the pipe will pass into the interior of the cylinder $d$ and the ring $f$ is secured to a cross-member $h$, said member $h$ and the flanged screwed socket $g$ being tied together by rods $j$. The cross-member $h$ is so arranged that the air in the interior of the cylinder $d$ can pass out into the vessel $b$. The chemical substances are arranged in the annular space between the cylinders $c$ and $d$ and the air in passing through the cylinder $d$ will come into contact with said chemical substances which will give up oxygen thereto. Similarly, when the air has passed out through the bottom of the cylinder $d$ into the vessel $b$ it will again come into contact with the chemical substances through the gauze cylinder $c$.

It is to be understood that part of the air may pass directly through the gauze cylinders $c$ and $d$ instead of passing out at the bottom of the cylinder $d$. The vessel $b$ is provided with an outlet pipe $k$ at the top thereof and said pipe is connected to a pipe $k'$ which leads into a second vessel $m$ containing petrol or other liquid hydrocarbon. The pipe $k'$ extends almost to the bottom of the vessel $m$ and is provided with a number of small orifices $n$ arranged below the level of the liquid in the vessel $m$. $o$ is an outlet pipe leading from said vessel $m$.

In cases where the velocity of the air through the plant is considerable, a trap is provided. Such a trap comprises a vessel $p$ into which the pipe $o$ extends on one side of a gauze screen $q$, or a series of such screens and an outlet $r$ from the top of the vessel $p$ is provided on the other side of the screen $q$. The outlet $o$ or the outlet $r$ as the case may be, is connected to a gasometer or otherwise as may be desired.

It is to be understood that any suitable form of carbureter may be employed in place of the vessel $m$ and pipe $k'$.

The air may in some cases be dried and it is preferably heated and it may be forced or induced through the plant. The most convenient method is to employ a pump driven by a hot air engine and to pass the air to be treated through the cooling jacket of the engine so as to serve the twofold purpose of cooling the engine and heating the air before its admission to the vessel $b$.

The oxygenating agents or materials employed may be varied in combination or quantity for different purposes as may be required, and such agents preferably comprise any of the alkaline peroxids such as the peroxids of sodium, barium, calcium, magnesium and the like, chlorate of potassium and permanganates of sodium and potassium. These agents may be employed in the proportions and combinations hereinafter set forth by way of example, but it is to be understood that any one or more of such agents may be used if desired.

The agents employed may be:—

| | |
|---|---|
| Peroxid of sodium | 14.5% |
| Peroxid of barium | 32.0% |
| Peroxid of calcium | 13.5% |
| Peroxid of magnesium | 10.5% |
| Chlorate of potassium | 7.0% |
| Permanganate of potassium | 12.0% |
| Permanganate of sodium | 10.5% |
| | 100.0 |

I claim:

1. In apparatus for oxygenating air, an outer vessel, cylinders of wire gauze within the said vessel, a screwed socket at one end of the cylinders, a cross member at the other end of the said cylinders, rods tying the said socket and member together, an air inlet pipe screwed into the said socket, an oxygenating agent packed between the cylinders, and an outlet pipe conducting oxygenated air away from the said outer vessel.

2. In apparatus for oxygenating air, an outer vessel, cylinders of wire gauze within the said vessel, arranged concentrically, U-section rings at the ends of said cylinders, a screwed socket at one end of the cylinders, a cross member at the other end of the cylinders, rods tying the said socket and member together, an air inlet pipe screwed into the said socket, an oxygenating agent packed between the cylinders, and an outlet pipe conducting oxygenated air away from the said outer vessel.

HERBERT WILLIAM IZOD.

Witnesses:
ERNEST GAPPERT,
JOSH JARRETT.

Copies of this patent may be obtained for five cents each, by addressing the "Commissioner of Patents, Washington, D. C."